(12) United States Patent
Kottana et al.

(10) Patent No.: US 11,102,516 B2
(45) Date of Patent: Aug. 24, 2021

(54) QUALITY AWARE ERROR CONCEALMENT METHOD FOR VIDEO AND GAME STREAMING AND A VIEWING DEVICE EMPLOYING THE SAME

(71) Applicant: Nvidia Corporation, Santa Clara, CA (US)

(72) Inventors: Thrinadh Kottana, Bangalore (IN); Vinayak Pore, Pune (IN); Chirayu Garg, Bangalore (IN); Soumen Kumar Dey, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 810 days.

(21) Appl. No.: 15/043,978

(22) Filed: Feb. 15, 2016

(65) Prior Publication Data

US 2017/0238022 A1 Aug. 17, 2017

(51) Int. Cl.
*H04N 19/895* (2014.01)

(52) U.S. Cl.
CPC ................................ *H04N 19/895* (2014.11)

(58) Field of Classification Search
CPC .................................................... H04N 19/895
USPC ............................................... 375/240.27
See application file for complete search history.

(56) References Cited

U.S. PATENT DOCUMENTS

| | | | | |
|---|---|---|---|---|
| 2009/0148058 A1* | 6/2009 | Dane | ...................... | H04N 5/145 382/251 |
| 2009/0262837 A1* | 10/2009 | Tokumo | ............... | H04N 19/176 375/240.27 |
| 2010/0150232 A1* | 6/2010 | Nguyen | ............. | H04N 21/2389 375/240.12 |

* cited by examiner

*Primary Examiner* — Farzana Hossain

(57) ABSTRACT

A viewing device, a method of displaying streamed data frames and a client viewing device are disclosed herein. In one embodiment, the video viewing device includes: (1) a screen, (2) a decoder configured to decode a data frame received in a bitstream from a transmitter to provide a decoded data frame, and (3) an error concealer configured to either discard the decoded data frame or select the decoded data frame for display on the screen based on a complexity of the decoded data frame.

20 Claims, 3 Drawing Sheets

TABLE 1: EXAMPLE OF FRAME STATISTICS AND QEC INTERPRETATIONS THEREOF

| FRAME STATISTICS | QEC INTERPRETATIONS OF FRAME STATISTIC |
| --- | --- |
| 'avg_bits_per_mb' FROM BITSTREAM | LESS BITS MEANS SIMILARITY TO PREVIOUS FRAME |
| 'NUMBER OF INTRA AND INTER MBs' | MORE INTRA, INDEPENDENT FRAME |
| 'NUMBER OF SKIP MBs' | MORE SKIPS, LESS DECODED ARTIFACTS |
| 'AVERAGE MAGNITUDE OF mvY' | LESS MOTION, LESS ARTIFACTS |
| 'AVERAGE MAGNITUDE OF mvX + mvY' | LESS MOTION, LESS ARTIFACTS |
| 'PSNR' WITH REFERENCE TO PREVIOUS DECODED FRAME | HIGH PSNR, SIMILARITY WITH REF, LESS ARTIFACTS |

FIG. 4

TABLE 2: EXAMPLE OF CORE STATISTIC THRESHOLDS FOR STATE 1

| RESOLUTION | BR (IN MBPS) | BPP (IN BITS) | MV_Y | MV_XY | PERCENTAGE OF INTRA MBs |
| --- | --- | --- | --- | --- | --- |
| 540p | <=2.5 | 0.2 | 60 | 100 | 25 |
| 720p | <=3 | 0.2 | 60 | 100 | 33 |
| 1080p/HIGHER | <=5 | 0.2 | 60 | 100 | 60 |

FIG. 5A

TABLE 3: EXAMPLE OF CORE STATISTIC THRESHOLDS FOR STATE 2

| RESOLUTION | BR (IN MBPS) | BPP (IN BITS) | MV_Y | MV_XY | PERCENTAGE OF INTRA MBs |
| --- | --- | --- | --- | --- | --- |
| 540p | >2.5 | 0.15 | 60 | 100 | 25 |
| 720p | >3 | 0.15 | 60 | 100 | 33 |
| 1080p/HIGHER | >5 | 0.15 | 60 | 100 | 60 |

FIG. 5B

QUALITY AWARE ERROR CONCEALMENT METHOD FOR VIDEO AND GAME STREAMING AND A VIEWING DEVICE EMPLOYING THE SAME

TECHNICAL FIELD

This application is directed, in general, to streaming media and, more specifically, to concealing errors when providing streaming media.

BACKGROUND

Game streaming and delay-sensitive content delivery over networks is an area of intense technical interest in the industry. End user experience in streaming applications, such as game streaming over WiFi networks, WAN networks or even over the Internet (the "cloud"), is crucial and a challenge. Nvidia Shield® and Grid® cloud game streaming from Nvidia Corporation of Santa Clara, Calif., for example, allow a client to play games on a remote server, or "transmitter." Output from the game takes the form of a video stream, which is typically encoded into an H.264 video stream, "packetized" into multiple Real-time Transport Protocol (RTP) packets, and then transferred over the network to the client, or "receiver," where it is viewed. Quality of Service ("QoS") is important and should be maintained in an acceptable level.

Streaming under constrained network conditions, however, is a huge challenge. One type of problem associated with streaming is the loss of packets, such as RTP packets. Packet losses can occur due to various reasons, such as, limited available network bandwidth or interference caused by other electronic devices operating in the same band of frequency as the streaming.

Packet losses in streaming adversely impact end user experience. For example, the packet losses may be reflected in stutters during game play and severe corruption. Error concealment methods which compensate for such losses can improve end user experience significantly. Imperfect error concealment, however, can result in objectionable artifacts.

Various conventional methods can be used to conceal errors from packet losses when streaming over a network. Some of these methods provide a solution at the source/server side by Forward Error Correction (FEC) to reduce the possible packet losses. Other methods are performed at the client/receiver side by looking at the available data and dropping the frame with packet losses and all the consecutive frames which use that frame as a reference frame at the client side. This method is called reference picture invalidation to avoid the corruption due to packet losses and error propagation due to wrong referencing.

SUMMARY

In one aspect, a video viewing device is disclosed. In one embodiment, the video viewing device includes: (1) a screen, (2) a decoder configured to decode a data frame received in a bitstream from a transmitter to provide a decoded data frame, and (3) an error concealer configured to either discard the decoded data frame or select the decoded data frame for display on the screen based on a complexity of the decoded data frame.

In another aspect, a method of displaying streamed data frames is provided. In one embodiment, the method includes: (1) decoding data frames received in a bit stream to generate decoded data frames, (2) determining a complexity of the decoded data frames, and (3) displaying at least some of the decoded data frames based on the determining.

In yet another aspect, a client viewing device for displaying video frames is provided. In one embodiment, the client viewing device includes: (1) a video screen, and (2) a processor configured to select decoded data frames to display on the video screen according to a complexity of the decoded data frame.

BRIEF DESCRIPTION

Reference is now made to the following descriptions taken in conjunction with the accompanying drawings, in which:

FIG. 4 illustrates a table, Table One, that indicates how in one embodiment QEC interprets quality of a B2 frame based on particular frame statistics;

FIG. 5A illustrates a table, Table Two, that provides examples of empirical thresholds for core frame statistics for a first state defined according to a streaming BR and a resolution; and FIG. 5B illustrates a table, Table Three, that provides examples of empirical thresholds for core frame statistics for a second state defined according to a streaming BR and a resolution.

DETAILED DESCRIPTION

Figure 1:
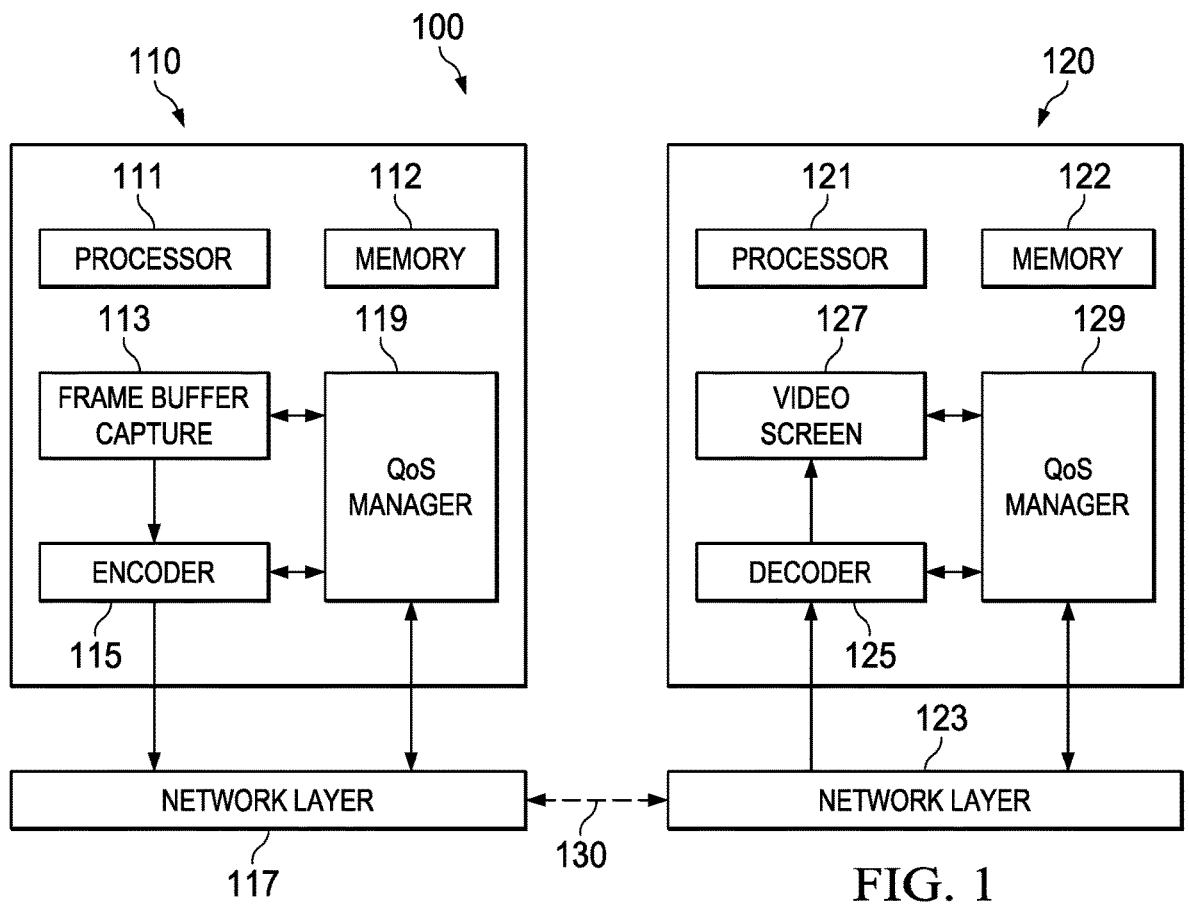
FIG. 1 illustrates a high level diagram of an embodiment of a network having a transmitter and a receiver constructed according to the principles of the disclosure.

It is realized herein that FEC at a source/server is limited by the available bandwidth and that reference picture invalidation at the client side results in stutters or pauses in a video or game play. It is also realized that the subjective video quality of the final outcome of the conventional concealing methods at the client/receiver is highly dependent on the complexity of the video/game content and often results in severe corruption not only in the lossy frames, but also all the subsequent fully received frames which refer to the lossy invalid frames.

It is further realized herein that the existing methods for hiding streaming errors fail to consider the complexity of the streaming content. In fact, the existing methods do not appear to even have the ability to understand the complexity of video or game content such that the propagation of errors can be reduced by avoiding corrupted frames as references for the consecutive frames. Instead, existing methods appear to drop all such frames that cause corruption and error propagation. For example, with reference picture invalidation at the client, all B1 and B2 frames are discarded (not displayed) until the next anchor frame is received. B1 and B2 frames are common to a streaming standard which uses Intra/I Frame followed by all Inter/P Frames (IPP) sequence of video compression methods, such as GameStream® from Nvidia Corporation. B1 frames are the frames which are lost (partially/fully) during transmission and B2 frames are the frames that are correctly received but are without a proper reference. That is frame/frames that are partially/fully lost are called B1 frames and cannot be used as a reference for future frame/frames streaming. Dropping many frames as done with reference picture invalidation, however, results in stutters/pauses and adversely affects the end user experience.

Thus, the disclosure provides a quality aware error concealment (QEC) scheme that understands the complexity of the video or game content and intelligently determines whether a frame of the video or game content should be dropped or can be used as a reference frame. The disclosure, therefore, provides an error concealing method that reduces frame corruption and error propagation while also reducing frame stutters of the streaming video or game content. Streaming video or game content as used herein is streaming content.

In various embodiments disclosed herein, the complexity of streaming content is understood by examining statistics from the bit stream of the streaming content and decoded frames of the streaming content. Complexity can be estimated using frame statistics such as average bits per macroblock, motion information, number of inter/intra macroblocks in the frame, etc. Frame statistics used for estimating complexity can be generated during the decoding process at the client side or can be sent from the server. One skilled in the art will understand that the above noted statistics are not exhaustive; other statistics can be incorporated into the QEC logic disclosed herein to estimate complexity.

The disclosure realizes that error propagation in the case of a less complex video sequence is not very bothersome to the end user experience whereas corruption will be very severe in cases of highly complex sequences. For example, corruption can be severely high in cases of high motion sequences. It is further realized herein that invalid reference frames in less complex sequences cause less corruption where as in cases of high complex sequences the resulting corruption will be more.

As noted above, frame complexity is measured as a function of frame statistics in one embodiment. Employing thresholds for B1 and B2 frames, clients can make a decision on whether to display a frame and use as a reference or to drop the frame based on the complexity of the frame. For example, frames quantified as low complex frames will be used as a reference and displayed to reduce the frame stutters/pauses. Whereas frames quantified as high complex frames will be dropped or discarded to reduce the error propagation.

As discussed below, the disclosure provides an error concealer that includes the logic to perform the QEC disclosed herein. In one embodiment, the QEC can be performed at the client side and the error concealer can be part of a decoder driver of the client. Decoder driver changes are packaged with over the air (OTA) releases for board support package (BSP) updates of client. Hence modifying/updating the QEC logic of the error concealer can be coupled with OTA releases.

In another embodiment, the functions of the error concealer are distributed between a server/transmitter and the client/receiver. In this embodiment, the QEC is lightly coupled with the client, wherein part of the error concealer is located in the server, such as in the encoder driver and network layer, and part of the error concealer is at the client side streaming application changes. In this embodiment, the error concealer is not part of the decoder driver. Hence it is not coupled with BSP releases and the error concealer can be modified/updated with frequent driver and/or streaming application releases.

FIG. 1 illustrates a high level diagram of an embodiment of a network 100 having a transmitter 110 and a receiver 120 constructed according to the principles of the disclosure. The network 100 can be a WiFi network, a WAN network or a network over the Internet (the "cloud"). The network 100 allows the transmission of streaming content. In some embodiments, the streaming content is game streaming, such as, from a PC to a game tablet, such as an Nvidia Shield®, and Grid® cloud game streaming.

The transmitter 110 is the source that generates the data for the streaming content. The transmitter 110 includes a processor 111 and a memory 112 that cooperate to generate the data and the streaming content for delivery. The transmitter 110 can be a server, such as a game server, that generates game data for delivery over the network 100 to the receiver 120 as streaming content. A game application, for example, may be stored on the memory 122 that directs the operation of the processor 111 to generate the game data. The transmitter 110 also includes a frame buffer capturer 113, an encoder 115, a Quality of Service (QoS) Manager 119 and a network layer 117. The frame buffer capturer 113, the encoder 115, the QoS Manager 119 and the network layer 117 can be implemented as hardware, software or a combination thereof. In some embodiments, a portion of the frame buffer capturer 113, the encoder 115, the QoS Manager 119 or the network layer 117 can be implemented on the processor 111, the memory 112, or a combination thereof. One skilled in the art will understand that the transmitter 110 can include other conventional components.

The frame buffer capturer 113 is configured to capture or buffer a complete frame of data for a video display, such as video screen 127 of the receiver 120. The frame buffer capturer 113 can be a portion of a RAM of the transmitter 110 that includes a bitmap having a complete frame of data that is provided to a video display.

The encoder 115 is configured to receive the frame data from the frame buffer capturer 113 and encode the frame data into a video stream. The network layer 117 is configured to receive the video stream from the encoder 115, generate packets for transmission over the network 100 and forward the packets over the network 100 via the communication link 130 to the receiver 120. The communication link 130 is a conventional link configured to communicate data packets between a transmitter and a receiver. The network layer 117 is configured to forward the packets as streaming content while maintaining quality of service. The QoS Manager 119 interacts with the frame buffer capturer 113, the encoder 115, and the network layer 117 to ensure QoS. The QoS Manager 119 is further configured to generate statistics that can be used to determine complexity of a frame.

In some embodiments, portions of the error concealer or QEC can be distributed across the transmitter 110 and the receiver 120. For example, the encoder 115 or driver thereof can provide core QEC frame statistics, such as, average bitstream size per MB, number of intra, inter & skip MBs, motion information, and bitrate information. Using these statistics, a preliminary QEC decision (yes/no) on each frame's complexity can be calculated. This preliminary metric can then be inserted into a packet header by the network layer 117 for transmission to the receiver 120. The packer header can be an RTP extension header. The preliminary metric can then be used along with other statistics at the receiver 120 to determine a final complexity metric on a B2 frame by the portion of QEC logic at the receiver 120 in case of packet losses.

The receiver 120 includes a processor 121 and a memory 122 that are configured to cooperate to direct operation of the receiver 120, such as, receiving streaming content and displaying the streaming content on the video screen 127. In addition to the video screen 127, the receiver 120 further includes a network layer 123, a decoder 125, and a QoS Manager 129.

The network layer 123, the decoder 125, and the QoS Manager 129 can be implemented as hardware, software or a combination thereof. In some embodiments, a portion of the network layer 123, the decoder 125, and the QoS Manager 129 can be implemented on the processor 121, the memory 122, or a combination thereof. One skilled in the art will understand that the receiver 120 can include other conventional components.

The network layer 123 is configured to receive the streaming content via the communications link 130 and provide the streaming content to the decoder 125. The decoder 125 is configured to decode the packets of the streaming content into data frames for display on the video screen 127. The video screen 127 is configured to display data frames to provide a video. The QoS Manager 129 is configured to interact with the network layer 123, the decoder 125 and the video screen 127 to ensure QoS. The QoS Manager 129 is further configured to generate additional frame statistics that can be used to determine complexity of a frame. An example of the additional statistics used for determining complexity include the length of B1 and B2 frames, display frames per second, number of consecutive good and bad B2 frames based on previous QEC results (i.e., QEC history), number of multiple losses within the B2 frames before the next anchor frame, and the previous QEC state (i.e., pass or fail). Other statistics that represent the idea of complexity can also be used, such as peak signal-to-noise ratio (PSNR).

With a distributed error concealer, the network layer 123 and the QoS Manager 129 cooperate with components of the transmitter 110 for QEC. In one embodiment, the network layer 123 receives the preliminary complexity information from the transmitter 110. The QoS Manager 129 employs this information with additional generated statistics, such as noted above, to estimate complexity and selectively display or discard decoded data frames.

In other embodiments, the error concealer is located at the receiver 120. In one such embodiment, the decoder 125, unlike conventional decoders, is further configured to determine the complexity of a decoded data frame and determine to either discard the decoded data frame or provide the decoded data frame to the video screen 127 for display. Thus, the error concealer that performs complexity determination and decoded data frame selection is located in the decoder 125. In some embodiments the error concealer is implemented in a decoder driver of the decoder 125. As discussed below, the error concealer or at least a part thereof can be external to the decoder 125 such as illustrated in FIG. 2.

Figure 2:
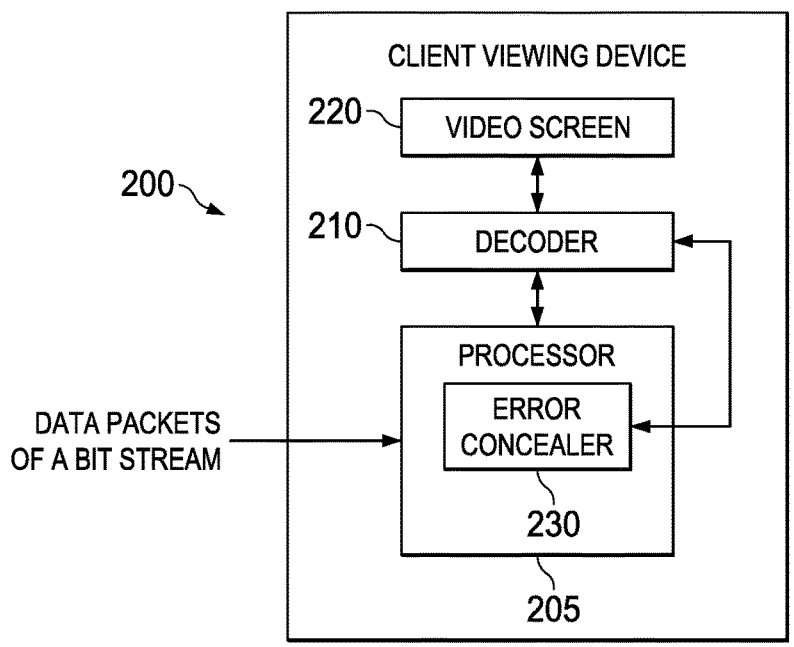
FIG. 2 illustrates a block diagram of an embodiment of a client device constructed according to the principles of the disclosure.

FIG. 2 illustrates a block diagram of an embodiment of a client viewing device 200 constructed according to the principles of the disclosure. The client viewing device 200 includes a processor 205, a decoder 210, a video screen 220, and an error concealer 230. The client viewing device 200 can be a game tablet that is designed for playing streaming video games. One skilled in the art will understand that the client viewing device 200 can include additional components typically included in a client viewing device, such as a memory.

The processor 205 is configured to direct operation of the client viewing device 200. The processor 205 can be a CPU that cooperates with a memory to perform various functions for the client viewing device 200. For example, the processor 205 can be configured to receive a bit stream of data packets having encoded data frames from a transmitter, process the received packets such as a network layer interface and deliver the frame data from the processed packets to the decoder 210 for decoding.

The decoder 210 is configured to generate decoded data frames from the frame data received from the processor 205. The video screen 220 is configured to receive the decoded data frames and display the decoded data frames as a video. The decoder 210 and the video screen 220 can decode and display as conventional decoders and video screens. Unlike conventional decoders, however, the decoder 210 is directed by the error concealer 230 to determine if a decoded data frame should be displayed or not displayed.

The error concealer 230 is configured to either discard a decoded data frame or select the decoded data frame for display on the video screen based on a complexity of the decoded data frame. The error concealer 230 is further configured to determine the complexity based on a frame statistic or statistics of the data frame. In one embodiment, the frame statistics include at least one of or a combination of the following core statistics: average bits per macro-block in the data frame, motion information (horizontal or vertical), number of inter macro-blocks in the data frame, number of intra macro-blocks in the data frame, bitrate (BR) and the number of skipped macro-blocks. Additional statistics, such as PSNR between consecutive data frames of the data frame, can also be used to determine complexity. In one embodiment, the error concealer 230 receives the frame statistics, or at least one frame statistic, from the transmitter that sent the bit stream. An encoder of the transmitter, such as the encoder 115 of FIG. 1, can generate the frame statistics for transmission to the receiver 200.

In other embodiments, the decoder 210 can generate the frame statistics, or at least one of the frame statistics, during the decoding process. For example, the decoder 210 can generate the additional frame statistics noted above, such as the length of B1 and B2, display FPS, previous QEC state, etc. The error concealer 230 receives the frame statistics for a decoded frame and determines the complexity of the decoded frame based thereon. In some embodiments, the error concealer 230 is configured to discard a decoded data frame when the complexity of the decoded data frame is defined as a high complexity data frame. In one embodiment, the frame statistics (e.g., core and additional) are compared to thresholds to determine if a frame is one of low or high complexity. The thresholds are statistic specific and can be empirical thresholds are derived from offline experiments to cover a wide variety of video content. Based on the results of the frame statistics compared to the known thresholds, each frame is categorized as a high or a low complex frame. A B2 frame that has a low complexity is one which can be decoded (using the last known good reference instead of its actual reference due to loss), displayed, and used as reference for future frames.

The error concealer 230 provides an improvement to displaying streaming content by reducing stutters/pauses to deliver smooth game play or video. Additionally, the error concealer 230 reduces error propagation by controlled dropping of B2 frames using frame quality as a metric; thus improving the end user experience for game playing or video watching in constrained networks. A constrained network is a communication network with a constraint, such as packet losses. The packet losses can be due to, for example, interference, channel losses, or low bandwidth to support good streaming.

The error concealer 230 can be implemented as part of the processor 205 and the decoder 210 can be a hardware decoder that is implemented on for example, dedicated hardware. In one embodiment the error concealer 230 is configured to estimate the quality of decoded B2 frames using the last known good reference frame and decide whether to send the decoded data frame to the video screen 220 for display. Increasing the number of B2 data frames that are displayed will minimize hitches/stutters. For example, the processor 205 can receive data packets and provide B2 frame data to the decoder 210. The decoder 210 decodes the B2 frame data and generates frame statistics during the decoding process. The frame statistics are provided to the error concealer 230 that determines the quality of the decoded B2 frame, e.g., whether high or low complexity. The error concealer 230 then directs the decoder 210 to queue selected B2 frames for display on the video screen 220 based on the quality of the frame.

Figure 3:
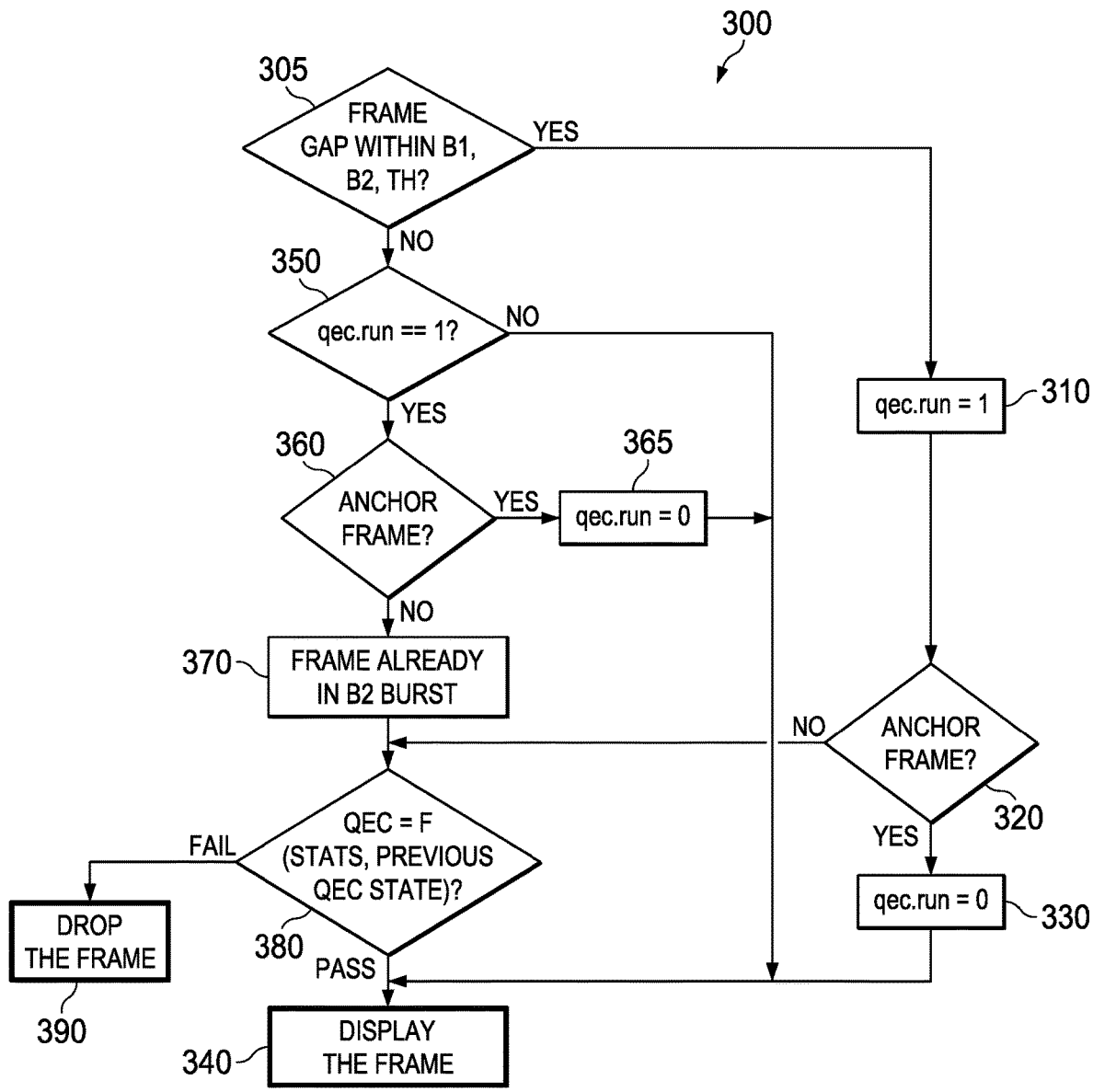
FIG. 3 illustrates a flow diagram of an embodiment of a method of displaying streamed data frames carried out according to the principles of the disclosure.

FIG. 3 illustrates a flow diagram of an embodiment of a method 300 of displaying streamed data frames carried out according to the principles of the disclosure. The method 300 corresponds to an algorithm that provides QEC as disclosed herein. The method 300 can be performed by an error concealer, such as the error concealer 230 of FIG. 2.

The method 300 determines if a decoded data frame should be displayed or discarded. Thus, the method 300 marks a frame either as pass or fail. Pass frames will be displayed whereas failed frames will be discarded. In one embodiment, only those B2 frames within thresholds of B1 & B2 lengths will enable the QEC according to method 300. A B1 threshold is the number of consecutive frame losses to allow and a B2 threshold is the number of consecutive frames to allow with a wrong reference. For example, B1 and B2 thresholds are set to 10 and 20. B2 frames after the B1 threshold of 10 frames and the B2 threshold of 20 frames, and before the anchor frame will be discarded. In one embodiment, only those B2 frames within the B1 and the B2 thresholds are passed through to the QEC logic of an error concealer to avoid passing B2 frames when there are huge consecutive losses over several frames which will incur severe corruption in case of false alarms by the QEC.

When the method 300 results in continuous pass frames depending upon a threshold, the method will enter to a pass-thru state where all the consecutive frames will be marked as good for display. This is because of IPP sequence format. Once the method 300 detects a certain number of good quality frames it assumes the rest of the frames will have decent quality. Similarly, if the method 300 detects continuous bad frames, the rest of the frames are discarded and marked as bad frames in skip state. The method also considers the current display fps and number of multiple losses before an anchor frame within the B2 burst. The lower the display fps due to some network issues, the higher is the possible perceivable corruption. The higher the number of multiple losses, the higher is the possible corruption. Using the previous state and the other statistics the method 300 can make a final decision for frame display or frame drop.

The method 300 begins in a first decision step 305 that determines if the frame gap of the present frame is within the B1 and B2 thresholds. If so, the method 300 proceeds to step 310 where a QEC counter is set to one. A determination is then made in a second decisional step 320 if the present frame is an anchor frame. If so, the method 300 continues to step 330 where the QEC counter is reset to zero. The method then continues to step 340 where the frame is displayed.

Turning back to the first decisional step 305, if the frame gap of the present frame is not within the B1 and B2 thresholds, then a determination is made in a third decisional step 350 if the QEC counter is one. If not, the method continues to step 340 and the present frame is displayed. If the QEC counter is one, the method continues to a fourth decisional step 360 where a determination is made if the present frame is an anchor frame. If so, the method 300 continues to step 365 wherein the QEC counter is set to zero and the present frame is displayed in step 340.

Turning back to decisional step 360, if the present frame is not an anchor frame, then the method 300 continues to step 370 wherein the present frame is deemed to be in a B2 burst. The method then continues to fifth decisional step 380 wherein a determination is made to either pass the frame or fail the frame. If the frame passes, the method 300 continues to step 340. If the frame fails, the method 300 continues to step 390 wherein the frame is discarded.

In step 380, the determination of whether the frame passes or fails is a function of the frame statistics and the previous QEC state. Previous state is the pass/fail status of the previous B2 frame which has gone through the QEC process. A pass or fail decision is a function of the frame statistics, i.e., all the frame statistics are compared against the thresholds of each of them. If the frame statistics are within the thresholds, the B2 frame is considered as a low complex frame and will be decoded, displayed and further used as reference for future frames. Otherwise, the B2 frame is considered as a high complex frame and will not be decoded, will be dropped, and discarded such that it cannot be used as a future reference frame. Thus, this eliminates (or at least reduces) the high complex frames that when decoded with a wrong reference will provide severe visual artifacts compared to the low complex frames that will not show perceivable artifacts when decoded with a wrong reference due to losses.

Turning back to the second decisional step 320, if it is determined that the present frame is not an anchor frame, then the method 300 continues to step 380 the determination between pass and fail is made. The method 300 ends in either step 340 with the decision to display a frame or in step 390 with the decision to drop a frame.

In one embodiment, frame quality is a function of the frame statistics and previous QEC state. Table One illustrated in FIG. 4 shows how QEC interprets quality of a B2 frame. Column 1 of Table One is an example of frame statistics that are used for QEC. Column 2 indicates what each frame statistic indicates when determining the complexity of a B2 frame. The quality of a frame corresponds to the complexity of a frame, a high complexity or a low complexity.

As noted above, the complexity of a frame is determined by comparing a frame statistic or statistics to a threshold for that particular frame statistic. In one embodiment, the thresholds are determined based on the resolution and streaming BR. For example, a resolution is first identified as 540 pixels, 720 pixels, 1080 pixels, or higher. The streaming is then categorized into two states based on the BR of the streaming and the resolution. State 1 is defined for a static game/video sequence into three levels:

540 pixels and a BR less than or equal to 2.5 mbps,
720 pixels and a BR less than or equal to 3 mbps, and
1080 pixels and higher and a BR less than or equal to 5 mbps.

State 2 is defined for a normal game/video sequence wherein the BR is greater than the above BRs of State 1. For each resolution and state, the thresholds are tuned for a wide variety of game content. The thresholds can be more relaxed in State 1 compared to State 2. Since the streaming BRs are low in State 1, game/video content might be of less complexity or can be static.

FIG. 5A illustrates Table Two that provides examples of core statistic thresholds for the different levels of State 1. FIG. 5B illustrates Table Three that provides examples of core statistic thresholds for State 2. For Table Two and Table Three, "BR" is the streaming bitrate, "BPP" is the bits per pixel (bit stream size of a frame/number of pixels in the frame), "MV_Y" is the average frame motion magnitude in vertical direction, "MV_XY" is the sum of average frame motion magnitudes in horizontal and vertical direction, and "% of Intra MBs" is the percentage of intra MBs in the frame. In some embodiments, a determination of frame complexity based on the core frame statistics includes a combinational check of each core frame statistic with the appropriate thresholds of Table Two or Table Three.

Known thresholds are also employed for other frame statistics. In some embodiments, a check of the core frame statistics is performed first and then a check of the additional statistics is performed before a final pass is given for display and for use as reference. If not passed, then the frames will be noted as failed and discarded. Five additional frame statistics and thresholds are provided below as examples. First, for B1 frames and B2 frames a range of [15, 60] can be used. B2 frames should be of this range else they will be failed. Above this range and frames will be discarded because of too many losses. This range is independent of resolution and BR.

For FPS, a threshold of 10. If streaming is less than this FPS threshold, B2 frames will be failed because very low fps pops up artifacts. This is also independent of resolution and BR.

For the frame statistic of the "Number of consecutive good frames," a threshold of two can be used. If the last two B2 frame's core QEC check is passed, then rest of the B2 frames will be passed, also. For the frame statistic of the "Number of consecutive bad frames," a threshold of three can be used. If the last three B2 frame's core QEC check is failed, then rest of the B2 frames will be failed, also.

For the "Number of multiple losses" different thresholds can be used for the different resolutions as followed: for resolutions of 540 pixels, 720 pixels, 1080 pixels, thresholds of 3, 0, 0. Within the current B2 frames, if there are additional losses before the next anchor frame, more than {3, 0, 0} frames are failed for 540 pixels, 720 pixels, 1080 pixels, respectively.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described system and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A video viewing device, comprising:
    a screen;
    a decoder configured to decode a data frame received in a bitstream from a transmitter to provide a decoded data frame; and
    an error concealer configured to discard said decoded data frame when a content complexity of said decoded data frame is higher than a content complexity threshold and select said decoded data frame for display on said screen when said content complexity of said decoded data frame is lower than said content complexity threshold.

2. The video viewing device as recited in claim 1 wherein said error concealer is further configured to determine said content complexity based on frame statistics of said data frame.

3. The video viewing device as recited in claim 2 wherein said frame statistics include at least one statistic selected from the group consisting of:
    average bits per macro-block in said data frame,
    motion information,
    number of inter macro-blocks in said data frame,
    number of intra macro-blocks in said data frame, and
    peak signal-to-noise ratio (PSNR) between consecutive data frames of said data frame.

4. The video viewing device as recited in claim 2 wherein said error concealer receives at least one of said frame statistics from said transmitter.

5. The video viewing device as recited in claim 2 wherein said frame statistics are generated during decoding by said decoder.

6. The video viewing device as recited in claim 2 wherein said frame statistics are related to a streaming content of said decoded data frame.

7. The video viewing device as recited in claim 1 wherein said error concealer receives a preliminary frame complexity decision from said transmitter.

8. A method of displaying streamed data frames, comprising:
    decoding data frames received in a bit stream to generate decoded data frames;
    determining a content complexity of said decoded data frames;

displaying at least some of said decoded data frames when said content complexity of said at least some of said decoded data frames is lower than a content complexity threshold; and discarding said at least some of said decoded data frames when said content complexity is higher than said content complexity threshold.

9. The method as recited in claim 8 wherein said determining said content complexity is based on statistics selected from the group of frame statistics consisting of:
average bits per macro-block in said data frame,
motion information,
number of inter macro-blocks in said data frame,
number of intra macro-blocks in said data frame, and
PSNR between consecutive data frames.

10. The method as recited in claim 8 further comprising discarding B1 frames of said data frames, said B1 frames being at least partially lost frames during a transmission.

11. The method as recited in claim 8 wherein said determining includes determining a content complexity of a correctly received frame that is without a proper reference.

12. The method as recited in claim 9 further comprising generating said frame statistics during said decoding.

13. The method as recited in claim 9 further comprising receiving said frame statistics via said bit stream.

14. The method as recited in claim 8 wherein said displaying is based on a low content complexity.

15. A client viewing device for displaying video frames, comprising:

a video screen; and a processor configured to discard decoded data frames when a content complexity of said decoded data frames is higher than a content complexity threshold and select said decoded data frames to display on said video screen when said content complexity of said decoded data frames is lower than said content complexity threshold.

16. The client viewing device as recited in claim 15 wherein said processor is configured to select said decoded data frames to use as a reference frame for a future data frame when said content complexity of said decoded data frames is lower than said content complexity threshold.

17. The client viewing device as recited in claim 15 wherein said processor determines said content complexity based on frame statistics of said decoded data frames.

18. The client viewing device as recited in claim 15 further comprising a decoder that generates said decoded data frames from a received bit stream.

19. The client viewing device as recited in claim 18 further comprising a network interface configured to receive said bit stream from a transmitter.

20. The client viewing device as recited in claim 19 wherein said processor is configured to determine said content complexity of said decoded data frames based on a preliminary frame complexity decision received from said transmitter and frame statistics obtained at said client viewing device.

* * * * *